United States Patent

Deming

[15] 3,685,142
[45] Aug. 22, 1972

[54] HIGH RESISTANCE ROTOR, MOTOR AND METHOD

[72] Inventor: Andrew F. Deming, Alliance, Ohio

[73] Assignee: The Alliance Manufacturing Company, Inc.

[22] Filed: June 3, 1970

[21] Appl. No.: 43,038

[52] U.S. Cl. .................29/598, 310/211, 310/216
[51] Int. Cl. .............................................H02k 15/02
[58] Field of Search ........29/598, 596; 310/211, 212, 310/216

[56] References Cited

UNITED STATES PATENTS

| | | | |
|---|---|---|---|
| 2,499,390 | 3/1950 | Joy | 310/211 |
| 3,521,098 | 7/1970 | Jesse | 310/211 X |
| 3,330,031 | 7/1967 | Rediger et al. | 29/598 |
| 2,781,466 | 2/1957 | Wagner | 310/211 |
| 2,350,012 | 5/1944 | Brady | 29/598 X |

*Primary Examiner*—John F. Campbell
*Assistant Examiner*—Carl E. Hall
*Attorney*—Woodling, Krost, Granger and Rust

[57] ABSTRACT

A high resistance rotor, high slip induction motor is disclosed wherein the high resistance is achieved by omitting alternate ones of the conductor bars in the squirrel cage and leaving the remaining apertures open. Normal high conductivity metal such as aluminum or copper is used for the conductor bars and by omitting alternate bars there is a saving of metal and an increase of resistance plus an increased cooling capacity in the periphery of the rotor to achieve a design class C or D motor. The foregoing abstract is merely a resume of one general application, is not a complete discussion of all principles of operation or applications, and is not to be construed as a limitation on the scope of the claimed subject matter.

7 Claims, 5 Drawing Figures

PATENTED AUG 22 1972

3,685,142

INVENTOR.
A.F. DEMING
BY Woodling, Krost,
Granger and Rust
ATTORNEYS.

HIGH RESISTANCE ROTOR, MOTOR AND METHOD

BACKGROUND OF THE INVENTION

Induction motors utilizing squirrel cage rotors are the most common of AC motors because this eliminates any slip rings, commutators or brushes resulting in a rugged motor. The normal design class A motor is one with normal low resistance in the squirrel cage for normal starting torque, normal starting current and low slip. This motor emphasizes good running performance at the expense of starting torque and is the most commonly manufactured motor. A design class C motor is one with high starting torque and low starting current. The high starting torque is achieved by a higher rotor resistance but is achieved at the cost of slightly lower running efficiency and higher slip. Typical applications are in driving compressors and conveyors. A design class D motor is one with high starting torque and high slip and this design has a high resistance rotor frequency achieved by brass bars in the conductor bars of the squirrel cage. This is stated in *Electrical Machinery* by Fitzgerald and Kingsley, McGraw Hill, First Edition 1952, Second Edition 1961, page 479. These design classes are set forth as standards by The National Electrical Manufacturers Association. This design class D motor produces very high starting torque at low starting current and a high maximum torque at 50 to 100 percent slip but runs at high slip at full load, perhaps 7 to 11 percent in the larger sizes and 10 and 20 percent in the sub-fractional horsepower sizes. The principle uses are for driving intermittent loads involving high acceleration duty and for driving high impact loads such as punch presses and shears. In the sub-fractional horsepower sizes a use may be such as a can-opener drive which is intermittent duty yet requires high starting torque and high torque when running to cut at the multiple thickness seam in the can.

Because design class A motors are the biggest volume in the industry, it has been customary for decades to design the stamping dies which stamp out the rotor laminations and the conductor bar apertures in these laminations, to achieve the low resistance rotor for this requirement of normal starting torque, normal starting current and low slip. This requires large apertures in relation to the lamination area still remaining between the bar apertures. For the relatively smaller percentage of production which requires design class C or D, it has been customary for many years to use the same laminations but to increase the resistance by one of several ways. If copper was previously used in the squirrel cage, then brass might be substituted for a part of the squirrel cage to increase the resistance the desired amount. If aluminum was used in the squirrel cage in a die cast construction, then alloys of aluminum were used with higher resistance or perhaps zinc alloy substituted. Brass has about four times the resistance of copper, and steel and zinc also have about the same resistance as brass. The substitution of brass bars in place of copper has quite commonly been resorted to, as shown by the above-cited publication. *Industrial Electricity* by John Nadon and Bert Gelmine, published by Van Nostrand Company, Second Edition, Copyright 1939 and 1951, discloses at pages 385 and 386 the effect of doubling the rotor resistance. This shows that the maximum torque remains the same but merely shifts the point of maximum torque toward the standstill point.

In the sub-fractional horsepower sizes, millions of these design class C and D motors are manufactured each year yet traditionally these have been manufactured utilizing the same rotor laminations as the normal resistance design class A motors and merely substituting a higher resistance material with the same shape of squirrel cage to achieve this higher resistance.

There is good reason for this action on the part of the motor industry for decades and that is because in these high volume production motors considerable machinery which is highly automated is used. Progressive dies are used to progressively punch the rotor apertures and punch the rotor laminations from a strip of lamination steel. Also progressive dies are used to punch the conductor bar apertures and punch the end rings from a strip of copper or brass. Round copper wire is often used in the small sized motors as the conductor bars and these are cut and fed by automatic machinery into apertures in a stack of rotor laminations. The end rings are provided on the two axial ends of the rotor lamination stack and a press is used to skew the rotor lamination stack and stake the ends of the conductor bars to the copper end rings. Such manufacturing procedure is quite common in the small sizes of rotors of approximately ¾ inch up to 1½ inch diameter. In the rotor diameter size of 1¼ inch and larger, it is fairly common to use die cast aluminum squirrel cages in the rotor laminations and again the rotor laminations are punched by progressive or compound dies, are stacked, are placed in the die casting machine and the aluminum squirrel cage is die cast in the conductor bar apertures and in annular rings to form the end rings. In either of these two methods where millions of motors are being made, manual labor cannot economically be employed and as a result such production lines are highly automated. From this it will be noted that it is most economical to use the same machinery to produce design class C or D motors as it is to produce the larger volume of design class A motors. Consequently, for decades it has been customary to use the same gauge of brass wire as the copper wire in such a squirrel cage for the high resistance. The machinery can cut off the brass wire and feed such conductor bars into the apertures and the same machinery can stake these conductor bars to the copper end rings. By empirical design it has been found that this change will approximately double the effective rotor resistance and achieve the desired design class C or D motor.

An alternative construction has been to retain the copper wires and instead to substitute brass end rings of the same thickness in place of the copper end rings. Again the same machinery is utilized, approximately doubling the rotor resistance and achieving the desired end.

For die cast squirrel cage rotors of aluminum alloy for design class A, it has been customary to use an aluminum or zinc alloy, for example, of lower conductivity to obtain these high resistance rotors for the design class C or D, using the same machinery and rotor laminations as for design class A.

If the squirrel cage is constructed of copper, brass or a mixture of copper and brass, it has now been realized that brass is considerably more expensive than copper for two reasons; it is slightly less expensive per pound in first cost, but has only about one-fourth the conductivity, so per unit of conductivity it is about three times as expensive; and, the scrap recovery value is less. It will be appreciated that in making millions of motors all of the punchings are saved from the brass end rings where the die has punched out the conductor bar apertures. These may be small in diameter, for example, one-tenth of an inch in diameter, but if the rotor has 18 apertures and a million motors are manufactured, two end rings per motor, this is 36 million apertures punchings and one cannot afford to throw these away. They are resold as scrap but the price for brass scrap is less than for copper because copper scrap price is 64 percent of the sheet copper price whereas brass scrap price is only 40 percent of the sheet brass price. This is partly due to the increased amount of refinery work necessary to refine the brass scrap. Accordingly, it has now been appreciated that these design class D motors are more expensive to manufacture than a design Class A motor because they use more expensive material with a smaller percentage of recovery of scrap. This increased expense is the rule in the industry despite the fact that the greatest attempt had been made to achieve economy by utilizing the same rotor laminations and the same automatic machinery to produce these motors as was already in existence to produce the larger volume of class A motors.

Accordingly, an object of the invention is to provide a high resistance squirrel cage rotor in a more economical manner.

Another object of the invention is to provide a high resistance squirrel cage using less conductor material in the squirrel cage to achieve high resistance.

Another object of the invention is to provide a high resistance squirrel cage and the method of making it which increases the amount of money recovered from the scrap inherently produced in the manufacture of the rotor.

Another object of the invention is to provide a high resistance squirrel cage rotor with increased cooling capabilities.

Another object of the invention is to provide a design class C or D motor utilizing less conductor material in the squirrel cage and increasing the cooling capabilities of the rotor which is desirable because of the high slip in such type of motor.

SUMMARY OF THE INVENTION

The invention may be incorporated in a high resistance rotor induction motor, comprising in combination, a stator, a rotor journalled on said stator, a first plurality of apertures spaced around the periphery of said rotor, conductor bars in less than all of said apertures, means interconnecting the ends of said conductor bars at each axial end of said rotor to form a squirrel cage having a resistance higher than if all apertures were filled with conduction bars.

Other objects and a fuller understanding of the invention may be had by referring to the following description and claims, taken in conjunction with the accompanying drawing.

DESCRIPTION OF THE PREFERRED EMBODIMENT

Figure 1:
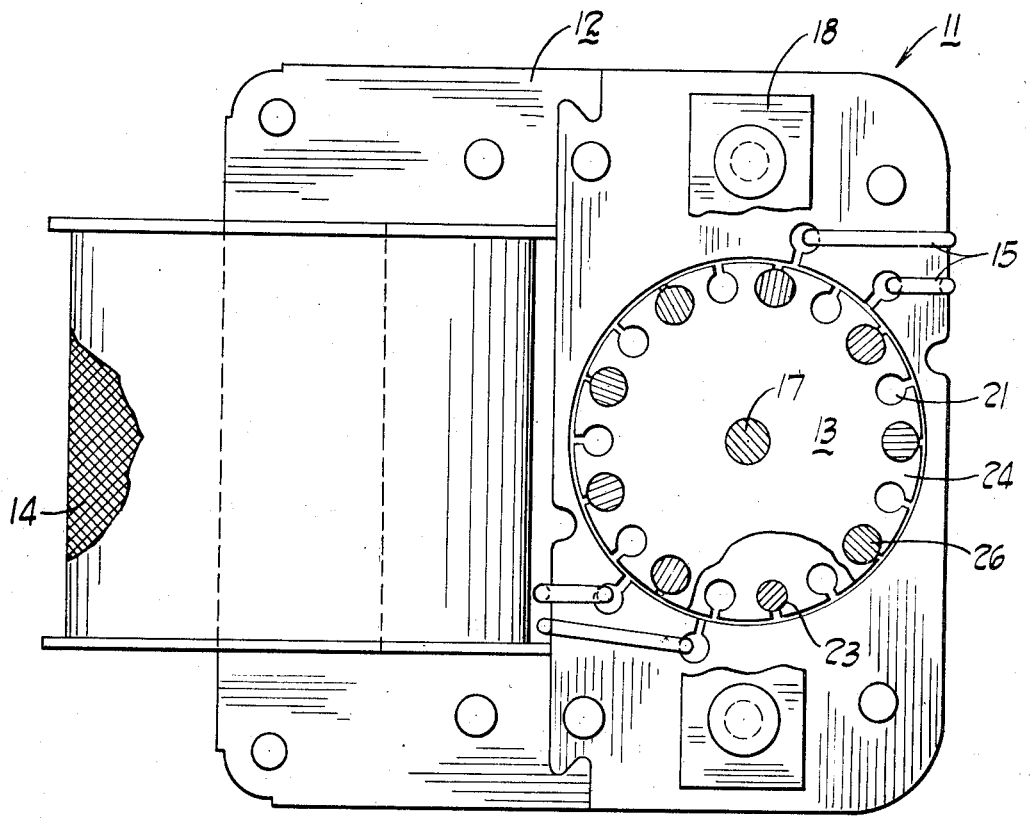
FIG. 1 is a plan view of a motor incorporating a high resistance squirrel cage of the invention.
Figure 2:
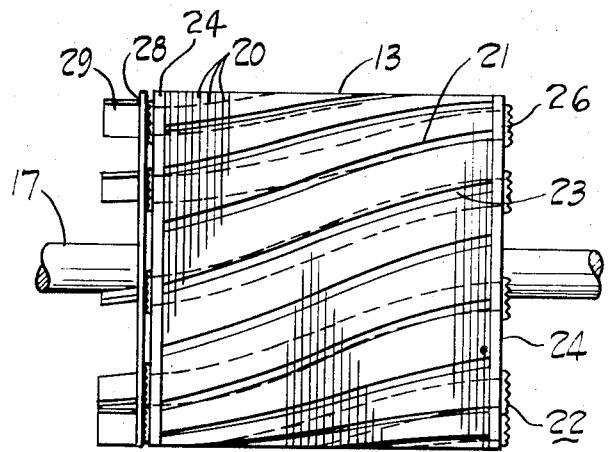
FIG. 2 is a side view of the rotor as removed from the motor.

FIGS. 1 and 2 illustrate an electric motor 11 incorporating the invention and although this is shown as a sub-fractional horsepower motor, the invention is not so limited but limited only by the hereinafter appended claims. The electric motor 11 includes a stator 12 and a rotor 13. A winding 14 is provided on the stator 12 to be energized by alternating current of single phase. Shading coils 15 are provided on diametrically opposite pole tips of this two-pole motor to provide a starting torque. The rotor 13 is fixed on a shaft 17 which is journalled in bearing brackets 18 on either side of the stator 12. The bearing bracket 18 is broken away in FIG. 1 to better show the construction of the rotor 13.

The rotor 13 is constructed from a stack of individual rotor laminations 20. These rotor laminations may be of the usual construction which may be stamped from lamination steel with conductor bar apertures 21 equally spaced around the periphery. In the construction illustrated there are 18 such apertures 21, as an example. A squirrel cage 22 is provided on the rotor 13 and includes generally conductor bars 23 and end rings 24. The conductor bars 23 are placed in less than all of the conductor bar apertures 21 and in this preferred embodiment the bars 23 are placed in alternate ones of such apertures to have a total of nine bars in the 18 apertures. This leaves empty at least one aperture in each 90° quadrant. The bars when initially placed in such apertures protrude from the ends thereof even beyond the ends of the end rings 24. Next the stack or rotor laminations with assembled bars 23 is placed in a press which not only skews these rotor bars, but stakes as at 26 the ends of the bars 23 to the end rings 24. This pressing and staking slightly mushrooms the ends of the bars and expands them into good electrical contact with the end rings 24. As illustrated in FIG. 1 this staking may be accomplished by V-shaped serrations on the staking die in the press to form radially directed V-shape staking grooves in the ends of the conductor bars. Any other form of staking to achieve good electrical conductivity may be used. An optional fan 28 may be secured to an end of the rotor 13 with the blades 29 of the fan disposed adjacent each of the apertures 21 which remain unoccupied by conductor bar material. The blades 29 may be bent from material struck from apertures in the fan 28. The ring of the fan 28 may also be the conductive end ring 24, if desired, because with the present construction such end ring has enough material to provide the fan blades between the conductor bar apertures. Also these blades may be generally parallel to the skew direction of such conductor bar apertures to aid in the pumping of air into and through such apertures for increased cooling capabilities of such motor. The maximum heat developed in the rotor is at the periphery of such rotor and this is where the extra apertures are located for air movement as optionally provided by the fan 28. This would be especially beneficial for continuous duty motors as opposed to intermittent duty.

Figure 3:
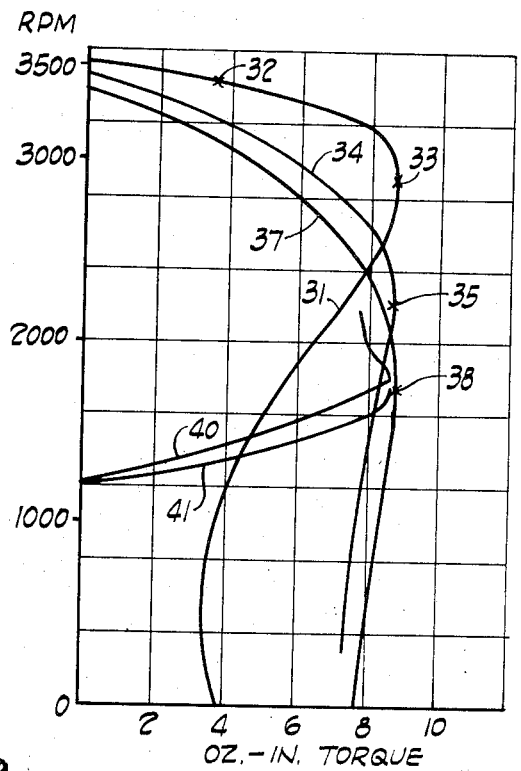
FIG. 3 is a graph of torque versus speed characteristics of the motor.

FIG. 3 illustrates a curve 31 of a typical design class A motor with this curve being a plot of torque versus speed. This would be a motor with normal starting torque, normal starting current and low slip. The motor might run at a point 32 for full load at a low slip for about 3,450 RPM for a subfractional horsepower two-pole motor on 60 Hz. A point 33 would be the maximum torque point. Curve 34 is the speed-torque curve of a design class D motor constructed according to the prior art with 18 copper conductor bars and brass end rings 0.050 inches thick. The conductor bars are No. 10 gauge copper. By comparison the curve 31 is typical of a design class A motor which would result if the 0.050 inch brass end rings were changed to 0.050 inch copper. This would approximately cut the rotor resistance in half and by empirical design it has been found that this will achieve the change between the design class D and design class A motors. This curve 34 has a maximum torque point 35 which is substantially the same torque as the point 33 for the design class A motor.

Curve 37 is a speed-torque curve of a design class D motor of the present invention. It has a maximum torque point 38 again substantially the same torque as points 33 and 35 and was achieved with nine conductor bars of No. 10 gauge copper and copper end rings of 0.040 inch thickness. Again by empirical design and a slight change in conductivity of the end rings or the conductivity of the conductor bars a slightly different effective rotor resistance may be achieved to vary the shape of this curve.

There are formulas for calculating the effective rotor resistance and the following is an example of two such calculations, one for the motor resulting in the prior art curve 34 and the second resulting in the curve 37 of the present invention. Both are for a rotor diameter of 1.12 inches, a stack height of 1.10 inches and both used with the same stator as tested to produce the curves 34 and 37.

PRIOR ART WITH

18– # 10 AWG Copper Conductor Bars and .050" Brass End Rings

| | Conductor Bar | Rotor End Ring |
|---|---|---|
| conductor section | 10380 Circular mils | 24,000 circular mils |
| size | .102" dia. (# 10) | .0508 × .472 |
| effective length of bar | 1.184 inch | 2 × 1.74 inch |
| length per phase (considered two phase) | .89 feet | 1.74 inch |
| Cold resistance 20°C | .882 × 10⁻³ ohms | .250 × 10⁻³ ohms |
| Hot resistance 70°C | 1.061 × 10⁻³ ohms | .30 × 10⁻³ ohms |
| Actual length per rotor | 2.11 feet | |
| End Rings referred to bars =(9/π)² × .30 × 10⁻³ | | =2.470×10⁻³ |
| Hot resistance of bars | | +1.061×10⁻³ |
| Hot rotor resistance referred to stator | | 3.531×10⁻³ |

PRESENT INVENTION WITH

9–**10 AWG Copper Conductor Bars and 0.224" Cu End Rings

| | Conductor Bar | Rotor End Ring |
|---|---|---|
| conductor section | 10380 circular mils | 10,700 circular mils |
| size | .102 dia. (# 10) | .0228 × .472 |
| effective length of bar | 1.184" | 2 × 1.74" |
| length per phase (considered two phase) | .89 feet | 1.74" |
| cold resistance 20°C | .445 × 10⁻³ ohms | .139 × 10⁻³ ohms |
| hot resistance 70°C | .530 × 10⁻³ ohms | .166 × 10⁻³ ohms |
| End rings referred to bars (4.5)²/π × .166= | | .34 × 10⁻³ ohms |
| Hot resistance of bars | | +.530 × 10⁻³ ohms |
| Effective rotor resistance | | .870 × 10⁻³ ohms |

Hot rotor resistance referred to stator equals effective rotor resistance times square of transformation ratio, stator winding to rotor winding =

$$0.870 \times 10^{-3} \times 4 = 3.48 \times 10^{-3} \text{ ohms} \quad (2)$$

Formulas (1) and (2) show the close correlation of the effective rotor resistance. In actual practice, a copper end ring of 0.040 inch thickness was used instead of 0.0224 inch for east of fabrication, and the test results are shown in curve 37, FIG. 3, with high starting torque.

The above calculations are based upon a stack height of 1.1 inches. Many motors of this rotor diameter are 1.122 inches and only about 5/10 or 6/10 inch stack height and are used for many uses such as circulating fans in refrigerators and freezers, phonograph motors and tape recorder drives and the like. These are all design class A motors with low rotor resistance. To increase the torque, the stack height may be increased to 1.1 inches referred to above. Accordingly, when the stack of rotor laminations is skewed in the stacking press, the normal one bar skew for a 0.6 inch stack will achieve a two-conductor bar aperture skew with the same No. 10 gauge wire. This is illustrated in FIG. 2. This permits omitting every other conductor bar yet still retaining a full one conductor bar skew. This eliminates the cogging effect when the motor is running which otherwise would be present if one bar skew was not achieved.

FIG. 3 also shows a curve 40 of watts versus torque for the design class D motor of the prior art wherein the speed torque curve is shown by curve 34. Curve 41 is a curve of watts versus torque for the design class D motor of the present invention. This shows that the watts input were no more, in fact, were slightly less for the same torque output.

The prior art has constructed squirrel cage motors for many years, U.S. Pat. No. 920,898 being a patent of 1909 showing such squirrel cage construction. This motor utilized tubular conductor bars but no attempt was used to utilize this construction for achieving a high resistance squirrel cage rotor; instead, it was constructed as a low resistance rotor because of the large diameter of the conductor bars relative to the remaining steel space between the conductor bar apertures. The reason for the tubular conductors was to permit the ends of the tubular conductor bars to be expanded against the end ring for a good electrical connection and also to provide an aperture, without necessity for drilling, into which balancing weights could be inserted. U.S. Pat. No. 2,350,012 showed conductor bar apertures of other than round cross-section, something like a Figure 8, so that either round wire copper conductor bars could be used or non-round die cast aluminum conductor bars could be used in the entire aperture, with each having the same lower resistance. Again this does not have a construction of conductor bars in less than all of the apertures to achieve a high resistance rotor. U.S. Pat. No. 2,630,464 disclosed additional axially directed holes on a smaller pitch diameter than the pitch diameter of the conductor bar apertures, but these extra holes were only for the purpose of reducing the amount of iron in the rotor and were not for the purpose of reducing the amount of conductor bar material used in the squirrel cage. U.S. Pat. No. 3,213,306 utilized a squirrel cage with a tortuous path for the conductor bars in a die cast construction to achieve high resistance and it will be noted that this actually increased the amount of metal required for the conductor bars rather than decreasing the required amount of conductor bar material as in the present invention.

Figure 5:
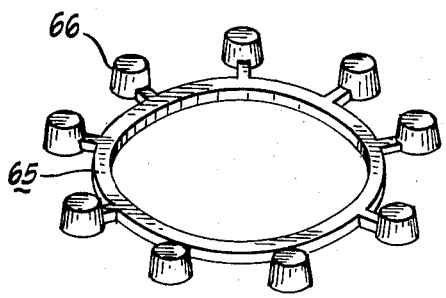
FIG. 5 is an adapter ring utilized in the apparatus of FIG. 4.
Figure 4:
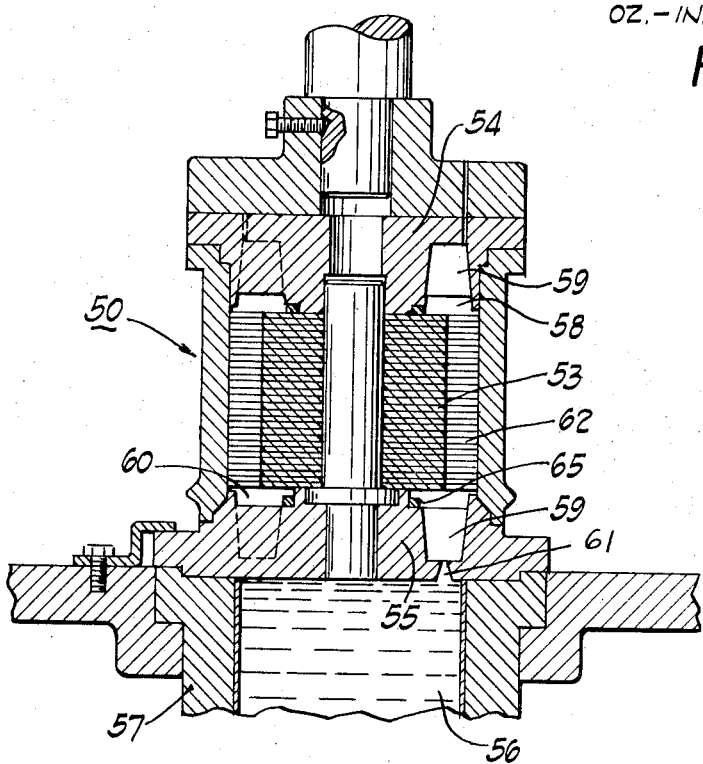
FIG. 4 is an elevational view of a modification of the method of constructing the high resistance rotor.

FIG. 4 illustrates a part of a die casting machine 50 for a modification of the invention wherein the squirrel cage is produced by a die casting method from molten metal. In such case the stack of rotor laminations 53 is placed in the machine 50 between an upper die 54 and a lower die 55. Axial pressure is applied to these dies by the machine 50 during the casting operation of the molten aluminum 56 in a container 57 below the lower die 55. The upper die 54 has a cavity 58 to produce an annular end ring which may also have fan blades 59, if desired. The lower die 55 also has a cavity 60 to produce an annular end ring again with optional fan blades 59. A sprue opening 61 leading to the container 57 permits ingress of the molten aluminum to fill the lower cavity 60, the conductor bar apertures 62 in the rotor 53 and the upper cavity 58. This will produce a normal design class A rotor with low resistance for normal starting torque, normal starting current and low slip. Now if a blocking ring 65, such as illustrated in FIG. 5, is placed in each cavity 58 and 60 in the upper and lower dies 54 and 55, then aperture plugs 66 on this ring 65 may extend slightly into the ends of the conductor bar apertures 62 to selectively block certain ones of these apertures. In the preferred embodiment alternate ones of such apertures 62 are blocked. With 18 such conductor bars there would be required nine of these aperture plugs 66 on the ring 65 and thus when the molten aluminum had been pressure cast and allowed to cool, the resulting squirrel cage will have only nine conductor bars. The remaining conductor bar aperture 62 will be open and there will be a corresponding aperture in the resulting annular end ring for passage of cooling air through these nine conductor bar apertures. The blocking ring 65 merely supports the aperture plugs 66 but is small in cross-section to fit within the cavities 58 or 60, to properly position these aperture plugs 66. The blocking ring does not interfere with the flow of the die-casting material nor appreciably reduces the cross-sectional area of the resulting end ring, after removal of the blocking ring 65. The axial height of the aperture plug 66 may be the same as the dimension in the axial direction of the cavities 58, 59 so that these aperture plugs 66 are held firmly in position in such cavities and establish air passageways through the resulting end rings.

Again the rotor laminations are skewed preferably to provide a one-bar skew to eliminate cogging during running of the motor. This die-casting method, as shown in FIG. 4 and 5, not only reduces the amount of material in the conductor bars, but also reduces the amount of material in the end rings for a saving at both locations. This effectively increases the rotor resistance to achieve a design class C or D motor. Also the fan blades produced by the cavities 59 will aid in circulating air through the open conductor bar apertures 62 which are located at the periphery of the rotor whereat the greatest amount of heat is developed. Thus, not only is conductive material saved in the squirrel cage but improved heat transfer characteristics are achieved by this invention.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

WHAT IS CLAIMED IS:

1. The method of making a high resistance induction-rum motor rotor, comprising the steps of,
    forming from magnetically permeable lamination material a rotor lamination having a first plurality of apertures around the periphery thereof said apertures being spaced substantially the same distance from said periphery,
    stacking a plurality of such rotor laminations to form a rotor lamination stack,
    placing conductor bar material in less than all of said apertures and leaving empty at least one aperture in each 90° quandrant of the stack for a saving of conductor bar material,
    and electrically connecting together the ends of said conductor bars at each axial end of stack to form a squirrel cage with a resistance at least twice the resistance of a design class A motor.

2. The method as set forth in claim 1, including placing conductor bar material in approximately half of said apertures.

3. The method as set forth in claim 1, including skewing the stack of rotor laminations to achieve substantially one conductor bar skew relative to the axis.

4. The method as set forth in claim 1, including placing conductor bar material in half of said apertures,
    and skewing the stack of rotor laminations to achieve a skew of substantially two apertures and a skew of substantially one conductor bar relative to the axis.

5. The method as set forth in claim 1, including placing a conductive end ring on each of the two axial ends of the rotor lamination stack with such end rings having apertures for each conductor bar, and electrically connecting said conductor bars to said end rings to form a squirrel cage to achieve high starting torque and high slip of the rotor.

6. The method as set forth in claim 1, wherein steel and copper strip and copper wire are used in conjunction with die means to make a high resistance squirrel cage rotor for an alternating current induction motor on the same machinery which produces normal low resistance design Class A squirrel cage rotors, including using the die means to stamp out a first plurality of equally spaced apertures around the periphery of a rotor lamination and stamping such rotor lamination from a steel strip, using the die means to stamp out apertures around the periphery of an end ring from a copper strip with the apertures equal in number to said first plurality and stamping such end ring from the copper strip, placing a copper end ring on each of the two axial ends of the rotor lamination stack with such end rings having apertures matching those in the steel laminations, placing conductor bars cut from copper wire in less than all of said apertures and leaving the remaining apertures empty for a saving of copper, skewing the rotor stack to achieve substantially one conductor bar skew, and electrically connecting said conductor bars to said end rings to form a high resistance squirrel cage with a resistance substantially higher than a resistance of a design class A motor to achieve high starting torques and high slip for a design class C or D motor.

7. The method as set forth in claim 1, including placing conductor bar material in said rotor apertures in a molten state, and solidifying said conductor bar material.

* * * * *